(12) United States Patent
van der Knaap et al.

(10) Patent No.: US 8,672,337 B2
(45) Date of Patent: Mar. 18, 2014

(54) MULTI-POINT HYDRAULIC SUSPENSION SYSTEM FOR A LAND VEHICLE

(75) Inventors: Albertus Clemens Maria van der Knaap, Helmond (NL); Arjan Pieter Teerhuis, Eindhoven (NL)

(73) Assignee: Nederlandse Organisatie Voor Toegepast-Natuurwetenschappelijk Onderzoek TNO (NE)

( * ) Notice: Subject to any disclaimer, the term of this patent is extended or adjusted under 35 U.S.C. 154(b) by 170 days.

(21) Appl. No.: 13/058,636

(22) PCT Filed: Aug. 12, 2009

(86) PCT No.: PCT/NL2009/050491
§ 371 (c)(1),
(2), (4) Date: Apr. 20, 2011

(87) PCT Pub. No.: WO2010/019038
PCT Pub. Date: Feb. 18, 2010

(65) Prior Publication Data
US 2011/0187065 A1    Aug. 4, 2011

(30) Foreign Application Priority Data
Aug. 12, 2008 (EP) .................. 08162235

(51) Int. Cl.
*B60G 17/04* (2006.01)

(52) U.S. Cl.
USPC ............ 280/124.106; 280/124.16; 280/6.157; 280/5.514

(58) Field of Classification Search
USPC .............. 280/124.106, 124.158, 124.159, 280/124.16, 6.157, 5.514
See application file for complete search history.

(56) References Cited

U.S. PATENT DOCUMENTS

| 3,807,678 A | 4/1974 | Karnopp et al. |
| 4,821,849 A | 4/1989 | Miller |
| 4,838,392 A | 6/1989 | Miller et al. |
| 4,872,702 A | 10/1989 | Medley |

(Continued)

FOREIGN PATENT DOCUMENTS

| DE | 43 34 227 | 4/1995 |
| DE | 4428605 | 4/1995 |

(Continued)

OTHER PUBLICATIONS

Roberts, Davide, "International Search Report", European Patent Office, Application No. PCT/NL2009/050491, mailed on Nov. 3, 2009 (4 pages).

(Continued)

*Primary Examiner* — Ruth Ilan
(74) *Attorney, Agent, or Firm* — Fish & Richardson P.C.

(57) ABSTRACT

A multi-point hydraulic suspension system for a land vehicle has two or more individual hydraulic actuators. These two or more actuators are each operatively arranged between a suspended structure and a wheeled base of the land vehicle for relative positioning one another. A common supply of pressurized fluid has a given pressure and a selectively operable pump with an inlet and an outlet, for increasing the given pressure of the common supply of pressurized fluid. A fluid reservoir is in selective fluid communication with the inlet of the pump. Controllable valve means are interposed between each of the two or more actuators and the common supply of pressurized fluid for selectively bringing each of the two or more actuators into fluid communication with the common supply of pressurized fluid in response to a control unit for controlling the valve means and the pump.

35 Claims, 9 Drawing Sheets

(56) References Cited

U.S. PATENT DOCUMENTS

| | | |
|---|---|---|
| 4,887,699 A | 12/1989 | Ivers et al. |
| 4,898,264 A | 2/1990 | Miller |
| 4,936,425 A | 6/1990 | Boone et al. |
| 5,024,302 A | 6/1991 | Karnopp |
| 5,044,455 A | 9/1991 | Tecco et al. |
| 5,097,419 A | 3/1992 | Lizell |
| 5,160,161 A | 11/1992 | Tsukamoto et al. |
| 5,342,023 A | 8/1994 | Kuriki et al. |
| 5,388,811 A | 2/1995 | Marjoram |
| 5,401,053 A | 3/1995 | Sahm et al. |
| 5,682,980 A | 11/1997 | Reybrouck |
| 5,862,894 A | 1/1999 | Boichot et al. |
| 6,017,023 A | 1/2000 | Greuter et al. |
| 6,311,110 B1 | 10/2001 | Ivers et al. |
| 2004/0113377 A1 | 6/2004 | Klees |
| 2007/0137913 A1 | 6/2007 | Wohanka et al. |
| 2007/0170680 A1 | 7/2007 | Knaap |

FOREIGN PATENT DOCUMENTS

| | | |
|---|---|---|
| DE | 198 60 233 | 7/2000 |
| DE | 102 16 132 | 10/2003 |
| EP | 0 311 524 | 4/1989 |
| EP | 0 385 618 | 9/1990 |
| EP | 0 427 046 | 5/1991 |
| EP | 0 530 755 | 3/1993 |
| EP | 0 371 709 | 7/1993 |
| EP | 0 579 182 | 1/1994 |
| EP | 0 469 051 | 6/1994 |
| EP | 0 470 991 | 7/1994 |
| EP | 0 608 650 | 8/1994 |
| EP | 0 470 993 | 11/1994 |
| EP | 0 471 734 | 11/1994 |
| EP | 0 470 166 | 12/1994 |
| EP | 1 175 307 | 1/2002 |
| EP | 1 238 834 | 7/2006 |
| EP | 1 902 874 | 3/2008 |
| EP | 2 000 336 | 12/2008 |
| EP | 2 065 231 | 6/2009 |
| EP | 2 065 232 | 6/2009 |
| EP | 2 065 233 | 6/2009 |
| EP | 2 065 295 | 6/2009 |
| JP | 01-278816 | 11/1989 |
| JP | 04-243611 | 8/1992 |
| JP | 05-038921 | 2/1993 |
| JP | 2000-264034 | 8/2000 |
| WO | WO 2005/108128 | 11/2005 |

OTHER PUBLICATIONS

Karnopp, D. et al., "Vibration Control Using Semi-Active Force Generators", *Journal of Engineering for Industry*, pp. 619-626 (May 1974).

Okasaki, Jun, "Notice of Reasons for Rejections", JP Patent Application No. 2011-522923, mailed on Oct. 15, 2013 (6 pages).

MULTI-POINT HYDRAULIC SUSPENSION SYSTEM FOR A LAND VEHICLE

CROSS REFERENCE TO RELATED APPLICATIONS

This application is the National Stage of International Application No. PCT/NL2009/050491, filed Aug. 12, 2009, which claims priority to European Patent Application No. 08162235.9, filed Aug. 12, 2008. The contents of the prior applications are hereby incorporated by reference.

FIELD OF INVENTION

The invention relates to a multi-point hydraulic suspension system for a land vehicle. More in particular the invention relates to an active suspension system for dynamically supporting a body structure and/or chassis structure of the land vehicle in relation to a wheeled base thereof.

SUMMARY OF THE INVENTION

Active leveling between a suspended vehicle body structure and a wheeled base is known from U.S. Pat. No. 5,097,419. Commercially available active suspension systems for passenger cars currently include: "Dynamic Drive" of BMW and "Active Body Control" of Daimler Chrysler. Active suspension of a driver's cabin of a truck, from a frame structure or like, is disclosed in EP 0579182. The known systems have been reasonably successful in stabilizing and damping movements resulting from cornering, accelerating, braking and driving a vehicle over uneven road surfaces. For the suspension of their suspended structures (passenger compartment, chassis or like concentration of masses on a vehicle) the known systems all rely on a continuously powered hydraulic system. Thereby these systems also consume power when there is no stabilizing or leveling action required. Also the known systems are fairly complex in using an important number of hydraulic components, which add substantially to the vehicle's weight. As a result some of the known suspension systems have resulted in unacceptable increases in fuel consumption.

Accordingly it is an object of the present invention to overcome or ameliorate at least one of the disadvantages of the prior art. More in particular it is an object of the present invention to reduce energy consumption in dynamic suspension systems. It is also an object of the present invention to provide alternative structures which are less cumbersome in assembly and operation and which moreover can be made relatively inexpensively. Alternatively it is an object of the invention to at least provide the public with a useful choice.

To this end the invention provides for a multi-point hydraulic suspension system as defined in any of the appending claims, either taken apart or in combination. Such a system provides for increased ride control and comfort at a significantly reduced consumption of energy. As an additional benefit the space requirements are also reduced, as is the addition of weight to a vehicle equipped with the system. Economy of energy also indirectly benefits from the latter aspects.

Further advantageous embodiments and elaborations of the inventive hydraulic suspension system and methods of operation thereof are set forth in the dependent claims.

DESCRIPTION OF THE DRAWINGS

The invention will now be explained in reference to the accompanying drawing figures in which.

DETAILED DESCRIPTION OF THE DRAWINGS

Figure 1:
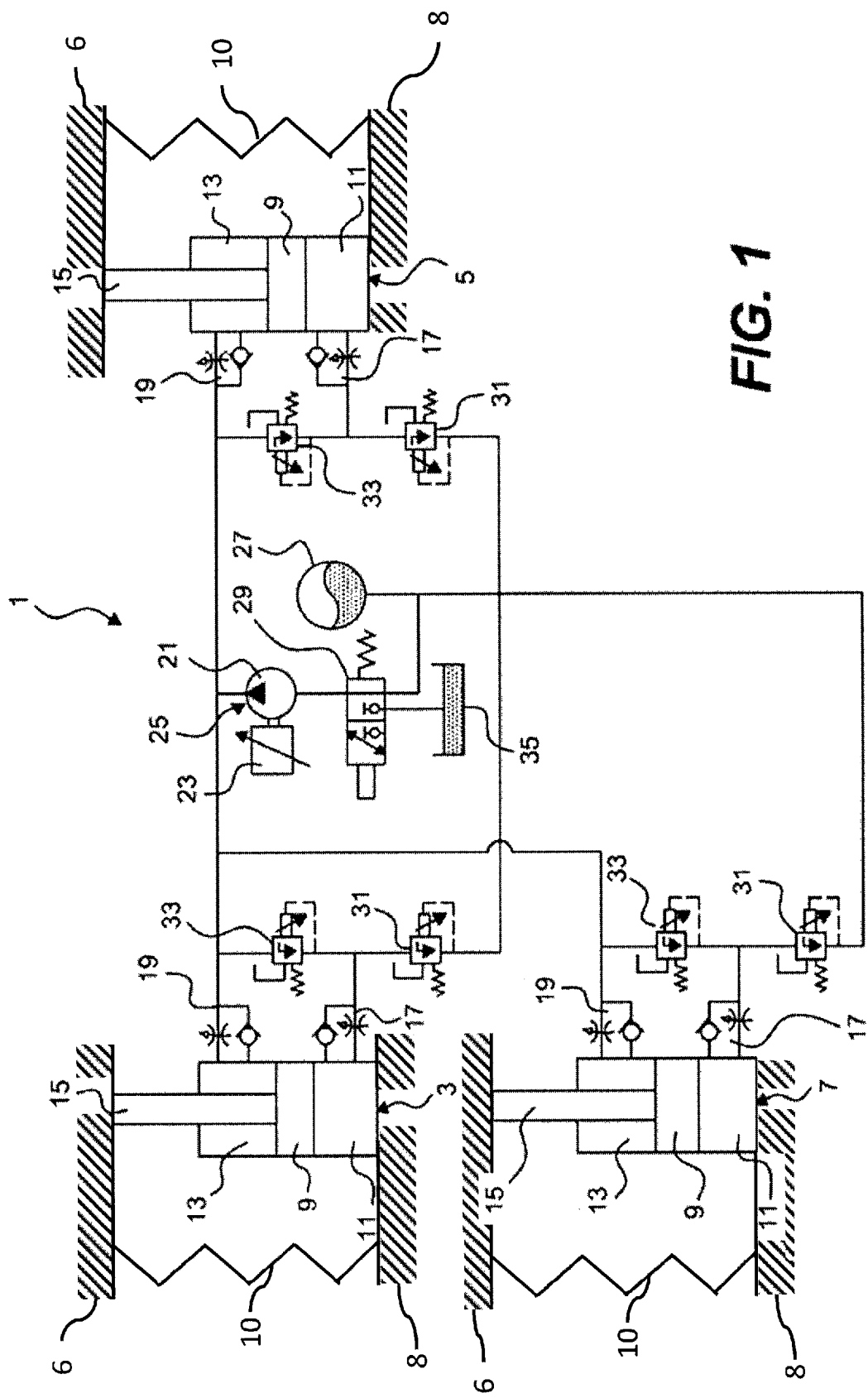
FIG. 1 is a schematic representation of a three-point hydraulic suspension system according to the basic principle of the invention.

A first embodiment of a hydraulic system 1 according to the invention is schematically illustrated in FIG. 1. Hydraulic actuators 3, 5, 7 provide the means for individually counter acting the movements of roll, pitch and heave to which a suspended vehicle structure may be subject. Each actuator 3, 5, 7 includes a movable piston 9, which defines a variable first (lower) volume 11 and a variable second (upper) volume 13 in a working cylinder. Each piston 9 is provided with a piston rod 15 that extends from the working cylinder to support a body or chassis structure 6 of a land vehicle. The lower end of the working cylinder of each actuator 3, 5, 7 can be supported from either a wheeled base or a chassis frame 8. The particular support for the lower end of the actuator depends on whether the hydraulic suspension system is used as a suspension for a unitary body of a passenger vehicle or for the suspension of a truck cabin on a truck chassis. In case of a three-wheeled passenger vehicle the actuators may be directly supported on the wheel assemblies. It will be clear to the skilled person that the opposite ends of the linear actuators can be inversed end-for-end, whereby the piston rod 15 will become the lower end and the opposite cylinder end will become the upper end. It will further also be clear to the skilled person that by using suitable linkages the hydraulic actuators can be positioned horizontally or at any angle in-between horizontal and vertical. For ease of reference the following description will refer to vertically positioned linear hydraulic actuators, but the invention is in no way limited to this form or position of actuator. As a mere example, rotary actuators can also replace one or more of the linear actuators if the vehicle's construction dictates this. A lower hydraulic connecting port of the lower volume 11 includes a first shock absorber valve assembly 17 and an upper hydraulic connecting port to the upper volume 13 has a second shock absorber valve assembly 19. Each of the first and second shock absorber valve assemblies 17, 19 is schematically represented by a throttle and a check valve arranged in parallel to differentiate between the dampening characteristics of an inward bound stream and an outward bound stream of hydraulic fluid. In a more simplified arrangement the shock absorber valve assemblies may be formed by only a throttle device and preferably an adjustable throttle device. The hydraulic system can be pressurized by a pump 21, which together with an electric drive motor 23 may be formed as a so-called power pack 25. The hydraulic system pressure is stabilized by an accumulator 27, which is selectively connectable to an inlet of pump 21 by level control valve 29. A first pressure control valve 31 is adapted to control a pressure differential between the first actuator volume 11 of each actuator and the accumulator pressure. A second pressure control valve 33 is arranged to control a pressure differential between the first and second actuator volumes 11, 13. A hydraulic fluid source 35 is arranged to be selectively connectable to the inlet of pump 21, in alternation with the accumulator 27, by the level control valve 29 as will be explained herein below. The hydraulic suspension system 1 thus includes a common supply of pressurized fluid with having a given pressure governed by the accumulator 27, connected between the level control valve 29 and the first pressure control valve 31, and the pump 21 connected between the level control valve 29 and the second pressure control valve 33. The pump 21 by the level control valve 29 is selectively connectable to the fluid source 35 to increase or decrease the pressure of the common supply as governed by the accumulator 27.

Figure 2:
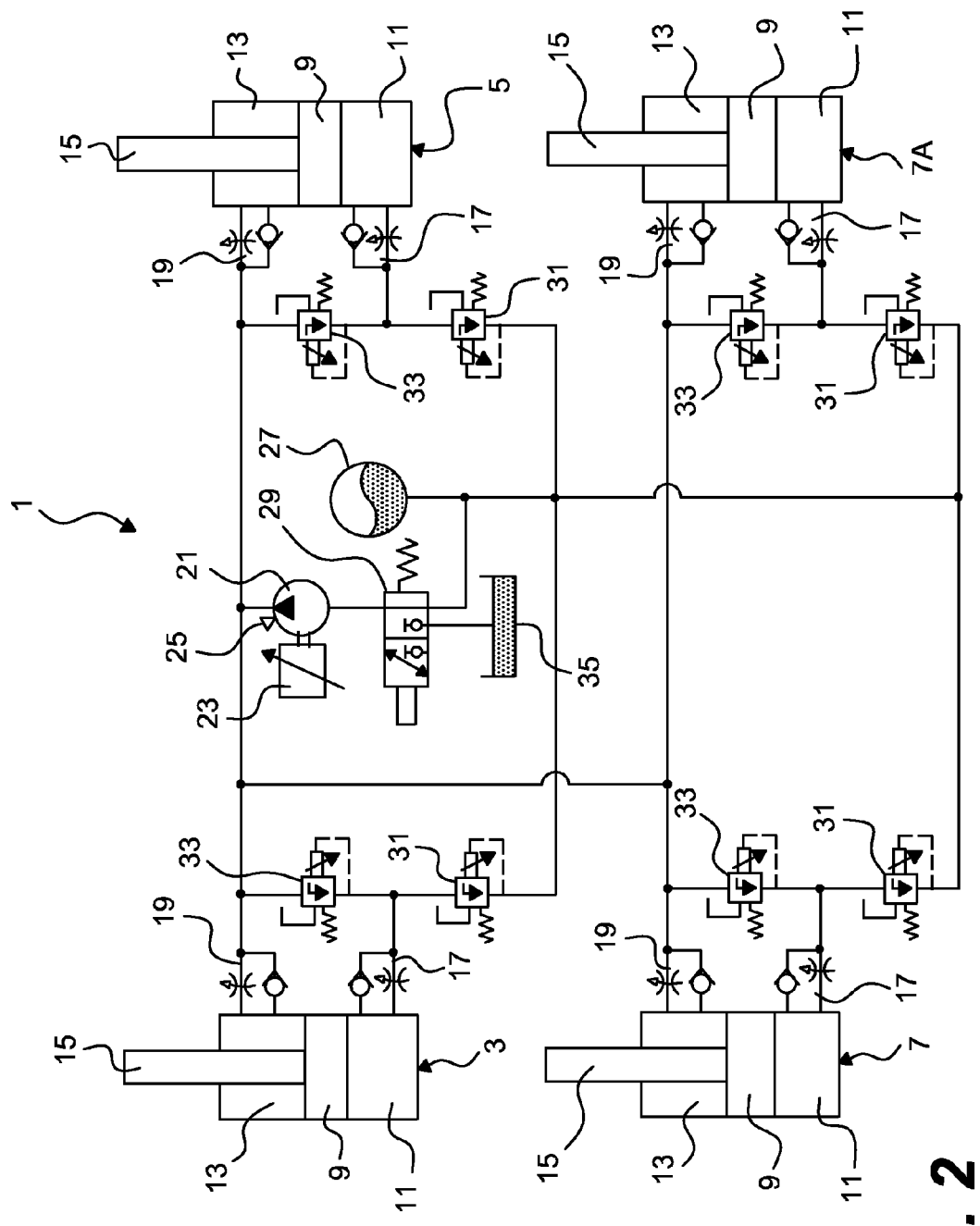
FIG. 2 is a schematic representation similar to FIG. 1 showing a four-point hydraulic suspension system.

In FIG. 2 a four-point version of the system of FIG. 1 is shown. The operating principle of this proposed four-point system 1A is preferably based on using a modified commercial type automotive shock absorbers as its four actuators 3, 5, 7, 7A. In view of the general similarity of the embodiments of FIG. 2 to that of FIG. 1, similar reference numerals will be used to indicate similar elements. Each existing commercial shock absorber 3, 5, 7, 7A, of the system of FIG. 2, is so modified that it can function as a hydraulic actuator by connecting it to a hydraulic installation. To this end the shock absorber valves, which are normally incorporated in the shock absorber's piston, are removed and combined with first and second connecting ports 17, 19 for the hydraulic circuit 1A. Fluid streams generated by rapid movements of the shock absorber's piston 9 will be throttled by the repositioned shock absorber valves 17, 19 in accordance with the desired shock absorber characteristics. Preferably the external shock absorber valves 17, 19 are made adjustable, which option is enhanced by their external accessibility. An advantage of using modified automotive shock absorbers, or hydraulic actuators modified with external shock absorber valves, is that such actuators 3, 5, 7, 7A can be accommodated in a location of a vehicle commonly reserved for suspension components. This eliminates mayor modifications to vehicles that may be susceptible to benefit from the inventive system.

The hydraulic system is fed by a so-called power pack 25, which includes a hydraulic pump 21 for pressurizing the system. This hydraulic pump 21 is driven by an electric motor 23 integrated in the power pack 25. Use of an electric pump drive enables the pump 21 to become mechanically disconnectable from the vehicle's prime mover, such as an internal combustion engine (not shown, but conventional) and be powered upon requirement by a vehicle's on-board electrical system. The hydraulic pump thereby will only need to consume power when required. The skilled person will understand that alternatively the electric drive can also be replaced by a disconnectable coupling or clutch between the hydraulic pump 21 and a power take-off on the vehicle's prime-mover. The hydraulic installation 1A further comprises an accumulator 27, a level control valve 29, various pressure control valves 31, 33 and a fluid reservoir 35. The hydraulic installation thereby accomplishes the following functions:

1. passively damping movements of major vehicle masses, such as truck cabins, passenger compartments and/or chassis structures;
   2. ride level control:
      a. cabin level, when used in trucks,
      b. body level, when used in passenger vehicles; and
   3. active suspension of the vehicle masses, such as truck cabins, passenger compartments and/or chassis structures, by creating suspension forces through pressure differentials in the actuators.

Figure 3B:
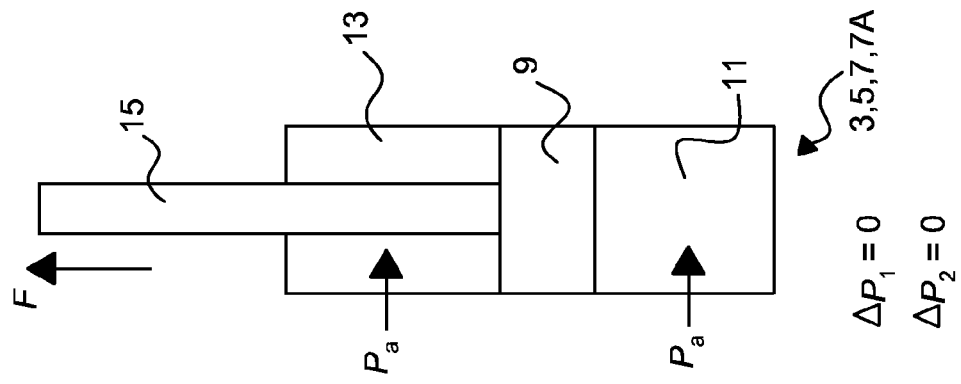
FIG. 3B shows the single actuator of FIG. 3A indicating the applicable pressures.
Figure 5A:
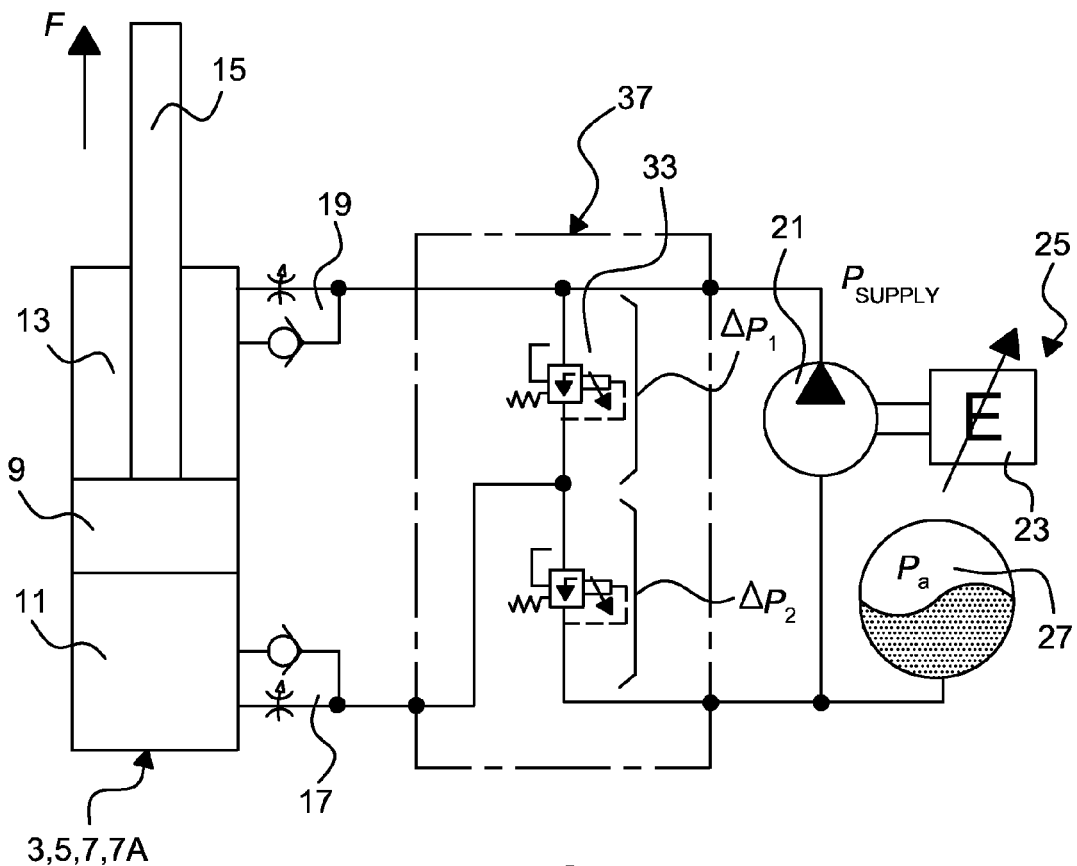
FIG. 5A shows the partial hydraulic circuit of FIG. 3A, when increasing the accumulator pressure.
Figure 5B:
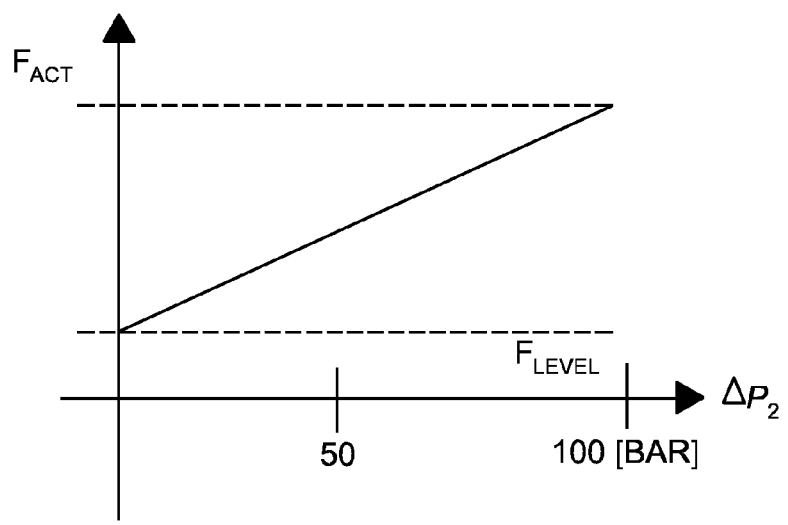
FIG. 5B shows a diagram of the relation between actuator force and hydraulic pressure when increasing accumulator pressure.

These functions will now be explained in more detail herein below. FIGS. 5A and 5B schematically show the situation for passive damping. When driving in a straight line the power pack 25 can be either completely deactivated or be used at reduced power. The suspended vehicle structures will then be dampened by the shock absorber valves 17, 19 associated with the individual actuators 3, 5, 7, 7A. In this situation the first and second pressure control valves 31, 33 at each actuator are opened completely, so that each drop in pressure, indicated as $\Delta p_1$ and $\Delta p_2$, equals zero. Thereby the pressure in both the first and second volumes 11, 13 of the actuator, separated by the piston 9, equal the accumulator pressure $p_a$, as schematically illustrated in FIG. 3B. Because the surfaces areas on opposite sides of the actuator piston 9 are different by the cross section of the piston rod 15 of the actuator, there will be a resulting outward force F to suspend the mass of the suspended structure.

Figure 4:
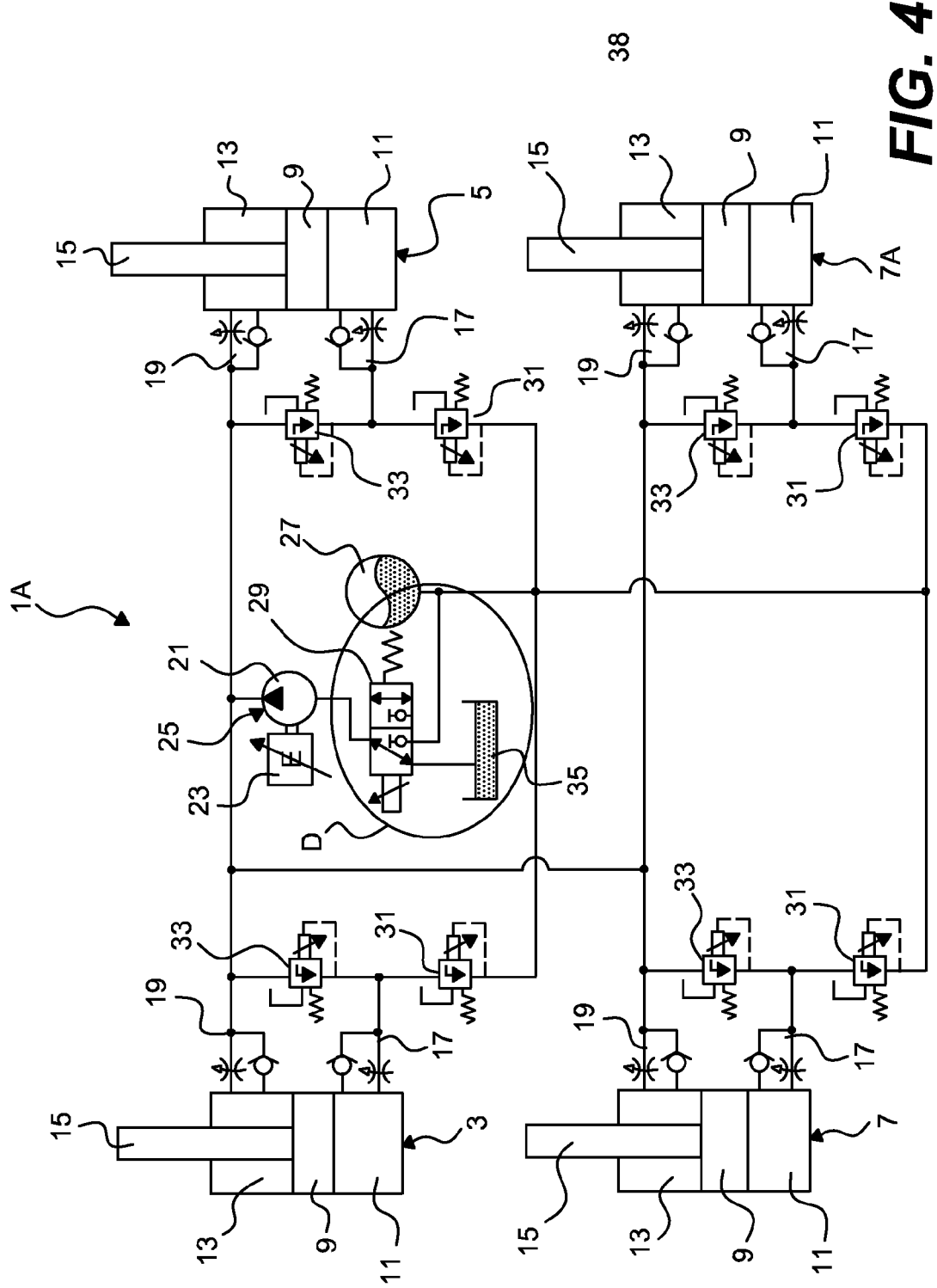
FIG. 4 shows a hydraulic circuit similar to FIG. 2, during level adjustment.

In FIG. 4 the situation is shown that applies to level control and thus the hydraulic circuit 1A is shown as in FIG. 2, but with the level control valve 29 in position for level adjustment (detail D). While the level control is explained in relation to the four-point hydraulic system 1A, it is equally applicable to the three-point system 1 shown in FIG. 1. The level control, with the system employed between a truck cabin and a truck chassis governs the level of the cabin in relation to the chassis. When in use with a passenger vehicle, the system controls the optimum height of the bodywork and chassis, or the unitary body construction, above the road. The level control, in particular with passenger vehicles, may also be used to reduce aerodynamic resistance by reducing the distance between the bodywork and the road surface. Advantageously the system can be arranged to automatically detect when the road surface conditions and vehicle speed would permit lowering of the bodywork for aerodynamic purposes. Further fuel may be saved by the provision of such an option. Level control is accomplished by adjusting the accumulator pressure pa to the actual loading conditions of the suspended body or cabin structure. This adjustment, which may require activation of the power pack pump unit 25, only needs to be carried out once upon starting the vehicle. System pressure is thereupon maintained during a trip by the accumulator 27, without further involvement of the power pack pump unit 25. Only in passenger cars there may be a need to activate the power pack pump 25 during a trip, when use is made of the level control to raise and lower the vehicle body in accordance with the road surface condition for aerodynamic purposes. Even when used with this option of additional level control, it is only necessary for the power pack 25 to be energized for only very brief periods of time. To further reduce the hydraulic pressures required in the system 1A, it is also possible to support the basic mass of the relevant body structure, such as a truck cabin or a passenger car body, by springs 10 arranged in parallel to the actuators (see FIG. 1).

When the loading condition of the suspended body structure is increased, the level control valve 29 enables the power pack pump to pump hydraulic fluid, such as oil, from the fluid reservoir 35. To this end the level control valve 29 is brought into the position shown in FIG. 4 (detail D). Thereby a passage connecting the reservoir 35 to the pump 21 is opened, while the normally open passage from the accumulator 27 to the pump 21 is closed. The system pressure can now be increased by the pumping of fluid from the reservoir 35 and because the accumulator 27 continues to be connected to the hydraulic system the accumulator pressure will be equally increased. The power pack pump 21 can also be used to drain hydraulic fluid from the system back to the fluid reservoir 35, in which case the system pressure will be lowered. The pressure control valves 31, 33 associated with each of the four actuators will, in both situations, remain in a fully opened position ($\Delta p1$ and $\Delta p2$ are each 0 in relation to Pa). The force exerted by the actuators 3, 5, 7, 7A ($F_{level}$) is linearly dependent of the accumulator pressure and supports the suspended body structure at the desired level, optionally assisted by parallel suspension springs 10 (see FIG. 1). The common supply of pressurized fluid hydraulic suspension system 1A, connecting to the first pressure control valve 31, and the second pressure control valve 33, via the level control valve 29 thus selectively connects the pump 21 to the fluid source 35 to increase or decrease the pressure thereof. Compared to currently available active suspension systems, such as "Dynamic Drive" of BMW and "Active Body Control" of Daimler Chrysler, also less pump flow will be needed to obtain the required system pressure. Passive use of the actuators thus advantageously results in a further reduction of energy consumption.

Active suspension and damping of the masses of vehicle body structures will be explained in reference to FIGS. 5A and 5B. When the body and/or chassis structure starts to roll, pitch or heave, such movements can be actively stabilized by the three-point and four-point hydraulic systems 1, 1A shown in FIGS. 1 and 2, respectively. During active damping the fluid reservoir 35 is disconnected from the hydraulic circuit. Reducing the movements of the body structure resulting from changes in the vehicle's direction of movement or in its speed of movement require the individual actuators 3, 5, 7, 7A to each exert an appropriate force F. These individually required forces are generated by activating the power pack 25 and controlling the pressure drop $\Delta p_1$ and $\Delta p_2$ by means of the first and second pressure control valves 31, 33. As shown FIG. 5B an upwardly directed force ($F_{act}$) is superimposed on the force ($F_{level}$) required for leveling the body structure. This force is being generated by fully opening the second pressure control valve 33 so that the pressure drop $\Delta p_1$ equals zero, as shown in FIG. 5A. The pressure drop $\Delta p_2$ at the same time equals the pressure drop over the power pack pump $\Delta p_{pump}$ (which equals: $p_{supply} - p_a$). In other words, the sum of the pressure drops $\Delta p_1$ or $\Delta p_2$ over the pressure control valves must be equal to the pressure drop over the pump ($\Delta p_{pump}$). Thereby the pressure in the actuator's upper and lower volumes 11, 13 equals $p_{supply}$ as generated by the power pack 25. Increasing the pump pressure ($p_{supply}$) at an accumulator pressure ($p_a$) that is kept constant will increase the force F acting on the body structure from a chassis or from a wheeled base.

Figure 6A:
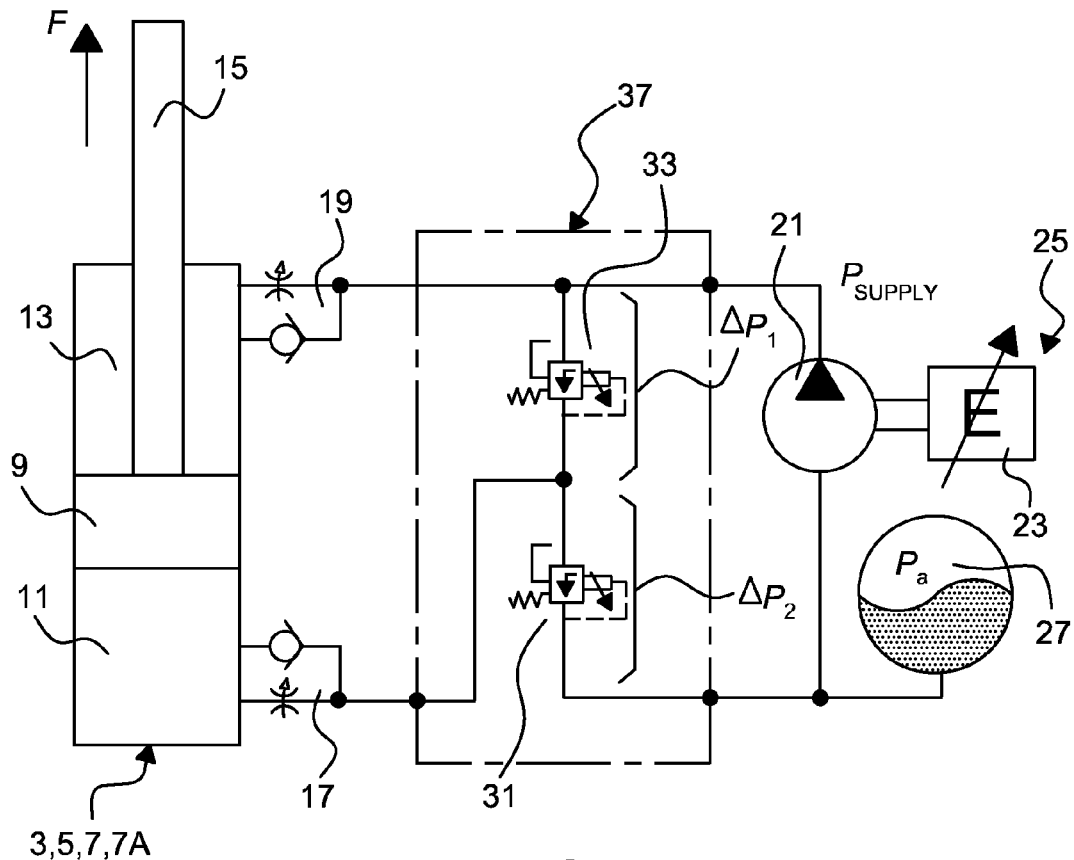
FIG. 6A shows the partial hydraulic circuit of FIG. 3A, when decreasing the accumulator pressure.
Figure 6B:
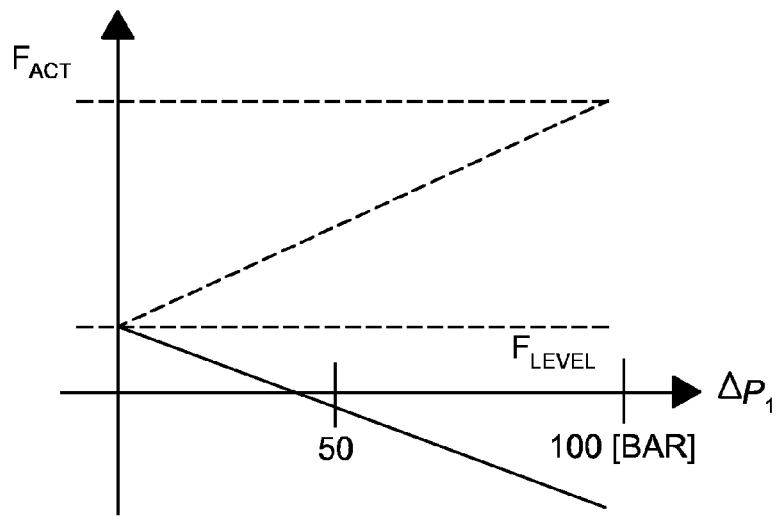
FIG. 6B shows a diagram of the relation between actuator force and hydraulic pressure when decreasing accumulator pressure.

In the inverse it also applies that when the pressure drop $\Delta p_1$ is made equal to the pressure drop over the pump ($\Delta p_{pump}$), the pressure drop $\Delta p_2$ will become zero. This situation is illustrated in FIGS. 6A and 6B. Under such circumstances the fluid pressure in the upper or second actuator volume 13 equals the pump supply pressure ($p_{supply}$) and in the lower or first actuator volume 11 the pressure equals the accumulator pressure ($p_a$). An increase of the pump pressure ($p_{supply}$) at constant accumulator pressure ($p_a$) then reduces the force acting on the body structure from the chassis or from the wheeled base. Eventually the direction in which the force (F) is moving the piston rod 15 will change to downwardly, rather than upwardly, as is illustrated in the graph of FIG. 6B.

Figure 7B:
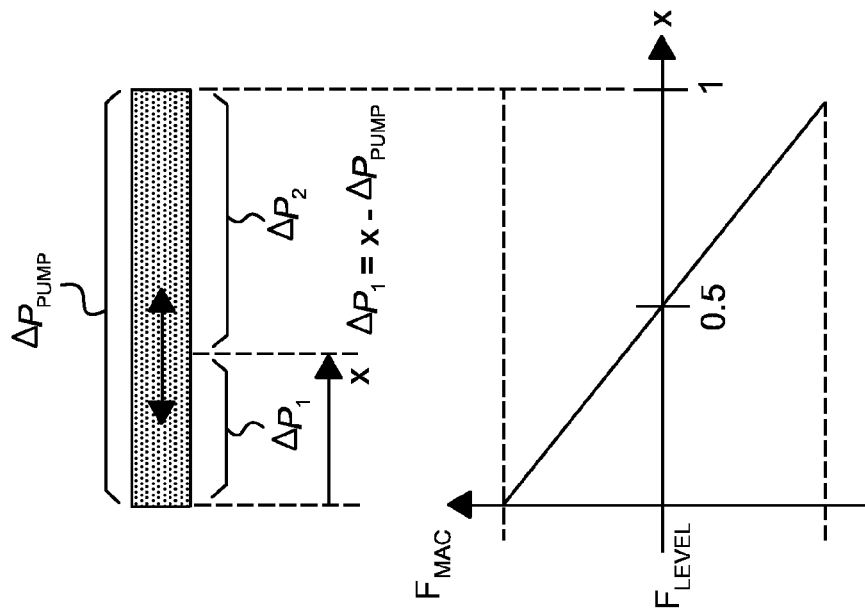
FIG. 7B shows a diagram of the relation between actuator force and hydraulic pressure when varying the pressure control valves.
Figure 7A:
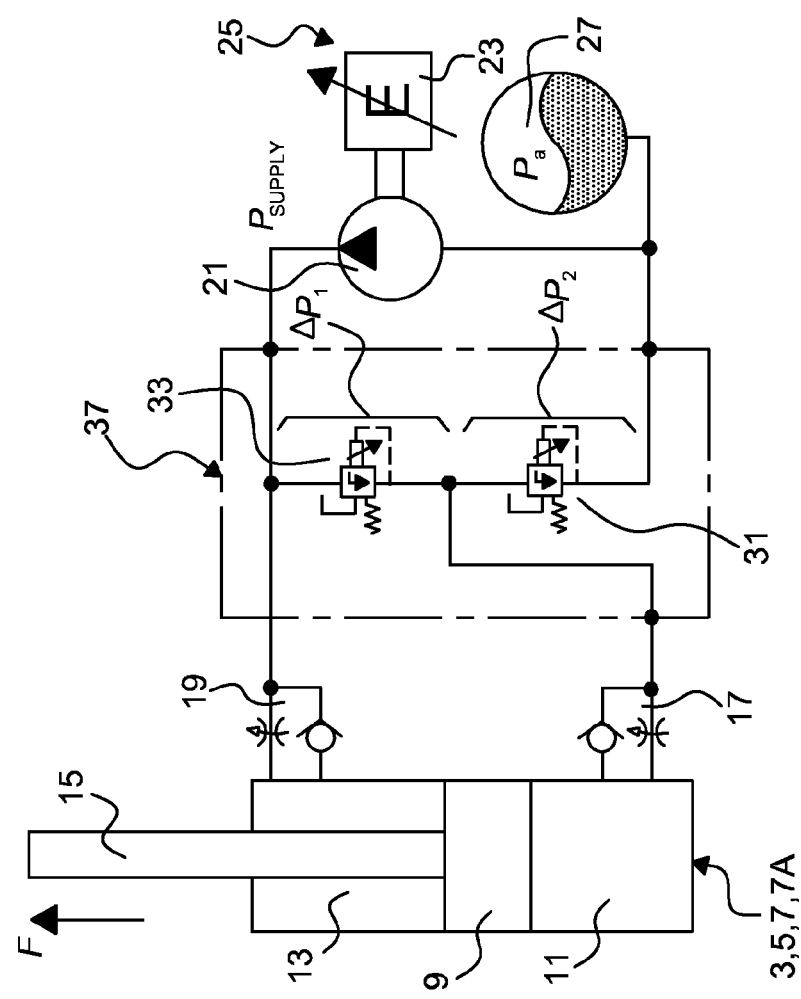
FIG. 7A shows the partial hydraulic circuit of FIG. 3A, when varying the pressure control valves.

FIGS. 7A and 7B again show the partial hydraulic circuit and pressure related actuator forces, but with the first and second pressure control valves 31, 33 variably operated for actuator forces in-between those of the situations illustrated in FIGS. 5A/5B and 6A/6B. Thereby the pressure differential over the pump $\Delta p_{pump}$ and the pump supply pressure $p_{supply}$ are constant. The pressure generated by the pump 21, $p_{supply}$, equals the highest pressure required by any one of the actuators 3, 5, 7, 7A to actively stabilize the body structure movements. The fluid pressure in the upper actuator volume 13 always equals the pump pressure $p_{supply}$. The fluid pressure in the lower actuator volume 11 depends from $\Delta p_1$ and $\Delta p_2$ ($\Delta p_2 = \Delta p_{pump} - \Delta p_1$), which is being controlled by the first and second pressure control valves 31, 33. The actuator force for a given $\Delta p_{pump}$ is:

(i) at a minimum when $\Delta p_1$ equals $\Delta p_{pump}$ (x=1 in FIG. 7B);

(ii) at a value in-between when $\Delta p_1$ is less than $\Delta p_{pump}$ and more than zero ($0 \leq x \leq 1$ in FIG. 7B); and (iii) at a maximum when $\Delta p_1$ equals zero (x=0 in FIG. 7B).

In the examples discussed herein above the pressure value x varies between 0 and 100 bar, but other values may apply in accordance with constructional requirements.

The use of individual sets 37 of first and second pressure control valves 31, 33 allows for one single pump 21 to generate individual forces in each of a plurality of actuators. Each set is thereby associated with a relevant one of the individual actuators 3, 5, 7, 7A. This arrangement in individual sets 37 provides for an important aspect of the present invention.

While in the described embodiments the pump supply pressure $p_{supply}$ is applied to the upper or second actuator volume 13, the skilled person will understand that the pump supply pressure, if so desired, can also be applied to the lower or first actuator volume 11. In that case the pressure applied to the second actuator volume will be varied.

The hydraulic suspension system according to the invention circulates hydraulic fluid under relatively elevated accumulator pressure and the power pack pump 21 suitable for use therein needs to be capable of accommodating such elevated pressures on its inlet side. Some pumps that are designed to accommodate higher pressures to their inlet or suction sides use a secondary bilge pump to return oil that has leaked through seals of the primary pump back into the hydraulic system. For reasons of energy consumption, complexity and reliability, the use of such pumps is less preferable in conjunction with the present invention. Preference should therefore be given to pumps that from a design point of view are inherently suitable to accommodate high fluid pressures on their suction sides.

Figure 8:
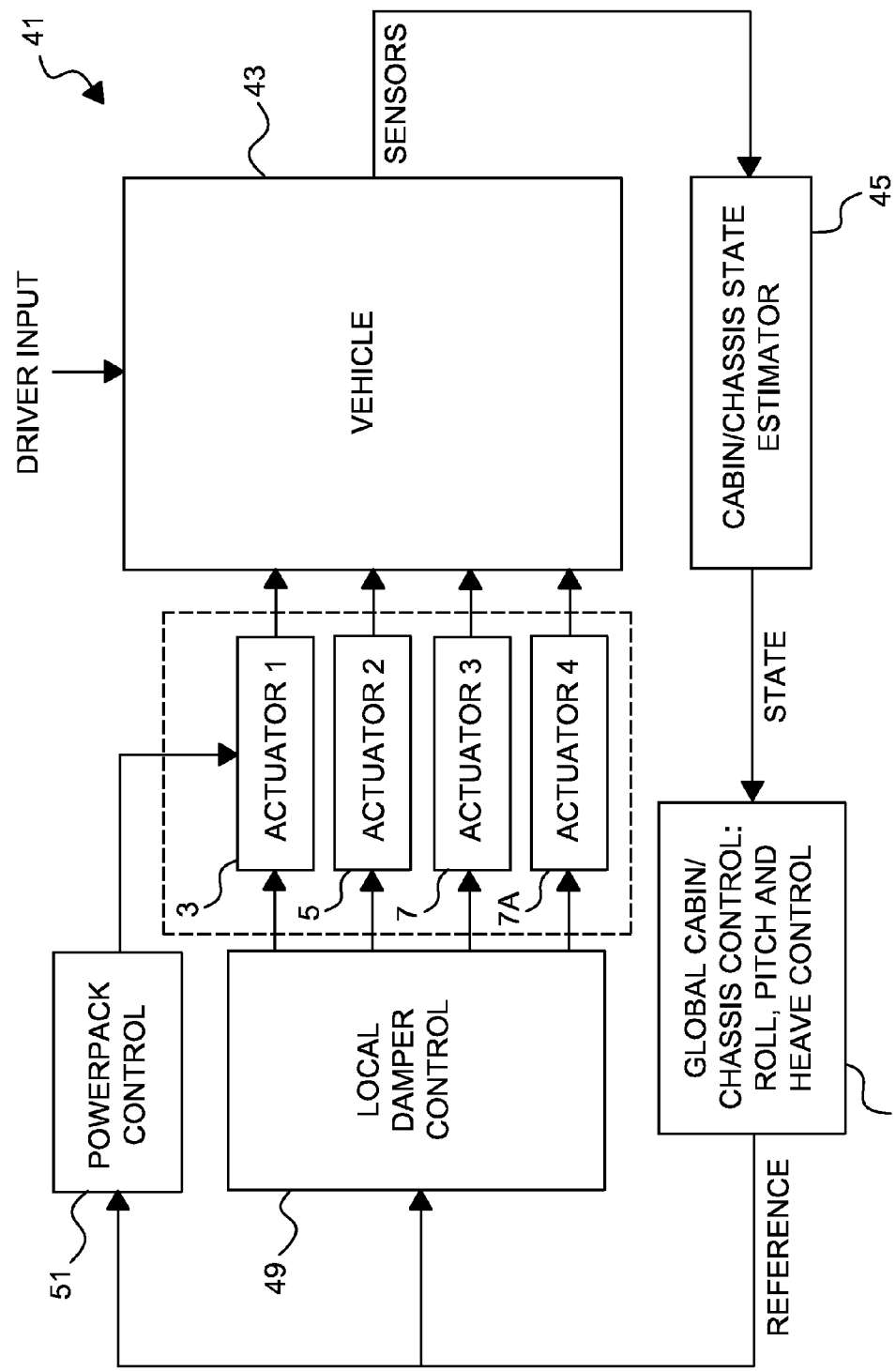
FIG. 8 is a schematic representation of an active control arrangement.

In FIG. 8 a control unit 41 for controlling active suspension arrangements in accordance with the invention is shown schematically. The control unit 41, to be suitable to control the plurality of individual actuators 3, 5, 7, 7A, takes input from a variety of supplies, including a selection of sensors and a human interface on the vehicle 43. Sensors mounted on the suspended body structure, and optionally also on the vehicle's wheeled base, provide input to a condition estimator 45, for estimating the condition of a suspended structure. This estimator of conditions 45 determines the current state of the suspended structure (cabin, chassis or like concentration of masses on a land vehicle). Some conditions can be determined by the condition estimator 45 without requiring sensor input. A global condition control device 47 subsequently calculates the compensating forces for the suspended structure, whereupon a local actuator control 49 individually controls each individual actuator 3, 5, 7, 7A. The global condition control device 47 also controls activation and interruption of the power pack (25), via a power pack control or pump control 51. Apart from sensors, the vehicle can also be provided with a human interface, in the form of a driver input, to present or adjust certain predefined parameters.

The control unit that controls the valves and the pump of the hydraulic suspensions system according to the invention thus in general includes a local multi-point hydraulic system controller, such as the condition estimator 45, and a global vehicle controller, such as condition control device 47. The local multi-point hydraulic controller serves the purpose to reach the setpoint values as quickly and as accurately as possible. Typical setpoints for a multi-point hydraulic system are the forces that should be imposed on the vehicle's suspension. Typically these force setpoints are determined by the global vehicle controller. The global vehicle controller will be discussed in further detail below.

The individual hydraulic hardware components (such as cylinders, pump and valves) can have the following sensors attached to them, that determine for example:

Pump: flow, pressure (inlet and/or outlet), rotational speed, etc. . . .

Valves: pressure and/or pressure-drop, flow, electrical current of the coil, etc. . . .

Cylinder: pressure in one or both chambers, piston-displacement, etc.

Since all top chambers of the cylinders (those that are directly connected to the outlet of the pump) are hydraulically connected, the pump should deliver just enough pressure to reach the maximum desired force. (In other words: the cylinder that should deliver the largest absolute force, determines the maximum system pressure, and thus the pump pressure).

The pump-unit is delivering hydraulic flow through the system. The amount of flow delivered by the pump is realized by controlling its rotational speed as instantly as possible. For this, preferably a relatively simple PI(D)-based controller is used.

All valves in the multi-point hydraulic system are so-called Pressure Control Valves (PCV). An electrical current controls the position of a small internal piston. This piston is able to fully block the hydraulic flow through the valve, fully open the flow, or anything in between. Given a certain pump flow and the state of all PCVs, there will be a certain (maximum) system pressure. Accordingly, to reach a (maximum) system pressure, the system controller is enabled to adjust the pump-flow and the PCVs.

As regards the global vehicle controller, it is typically, in vehicles, that the driver decides and controls the direction and speed of travel. The driver therefore uses the steering wheel and the throttle and brake controls. In case of a manual transmission, the driver usually also has the control over a clutch pedal and a gear selector. The vehicle controller continuously checks the driver's demands and controls each subsequent subsystem such that together they fulfill the driver's wishes. Occasionally the driver can be in an instable situation, such that the controller decides to apply the brakes while the driver himself does not press the brake-pedal. So the vehicle controller also has a function in stabilizing the vehicle. For that purpose it may use systems which are not used exclusively by the driver (e.g. brakes may be used without the driver touching the brake-pedal, steering system may be used whilst the driver does not rotate the steering wheel). For this purpose, the vehicle controller and system controller of the multi-point hydraulic system can also be used. The multi-point hydraulic system can provide different modes of operation that include anything in between extreme comfortable and extreme sportive ride characters. In instable situations, the controller will most likely decide to set the suspension behavior to sportive, as to maximize the road holding capacities. To be constantly aware of the current situation (state) of the vehicle, the vehicle is preferably equipped with various sensors (e.g. velocity and acceleration sensor, angle rate sensors, etc. . . . ), grouped in a "Vehicle Sensor System"-block.

The "Vehicle Sensor System" can either include physical sensors only, or it can be a combination of physical sensors and a computer algorithm which is usually called a "Vehicle State Estimator" (VSE). An advantage of the VSE is that it has the ability of determining values for which there is no specific physical sensor associated with the vehicle. This ability will be referred to as "Virtual Sensor". This method implies a cost-reduction for the entire vehicle (reducing the number of sensors).

The global controller usually will have a complete model of the vehicle at its disposition, such that it can predict which systems should be used to achieve a desired setpoint. The controller itself can either be designed according to continuous (conventional) control methods (e.g. PI/PD/PID-control, optimal LQR control, H2/H∞-control, Sliding-Mode control, etc. . . . ) or via an event-based control (e.g. Fuzzy Logic).

Figure 3A:
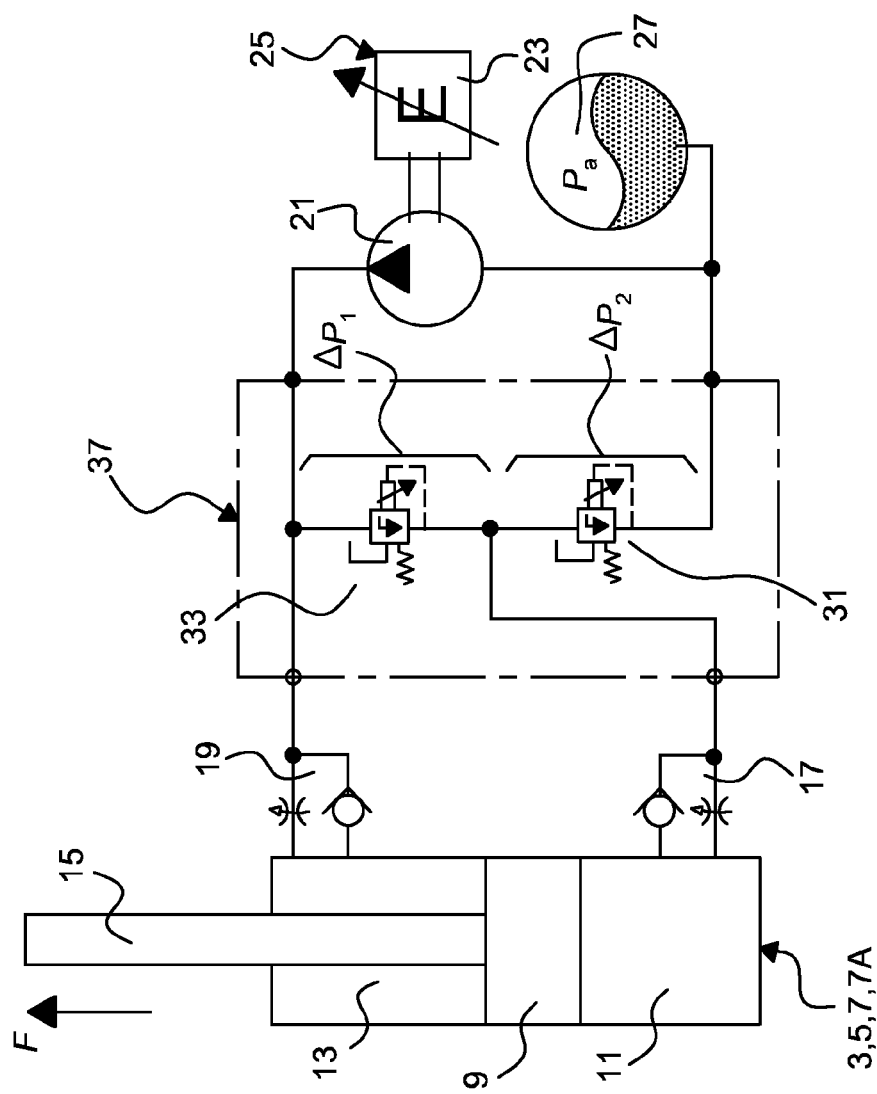
FIG. 3A shows a partial hydraulic circuit in combination with a single actuator, when in passive use as a shock absorber.

Thus the multi-point hydraulic system combines two modes of operation: a passive and an active mode. When in passive mode, when the controller and the pump unit are shut down, the vehicle behaves like a normal car with normal shock absorbers and normal (air/coil) springs. Hence to passively damp movements of the major vehicle mass it is not necessary to have the controller switched on. The passive motions are taken care of by the (passive) valves which are connected directly to the actuator (see also FIGS. 3A and 3B). Once the system is switched on, either automatically or manually, (i.e. "in control-mode"), then forces additional to the passive forces can be imposed on the suspension system. The controlled forces can of course also be used to assist the passive damping to better damp out the movements of the major vehicle mass.

Figure 9:
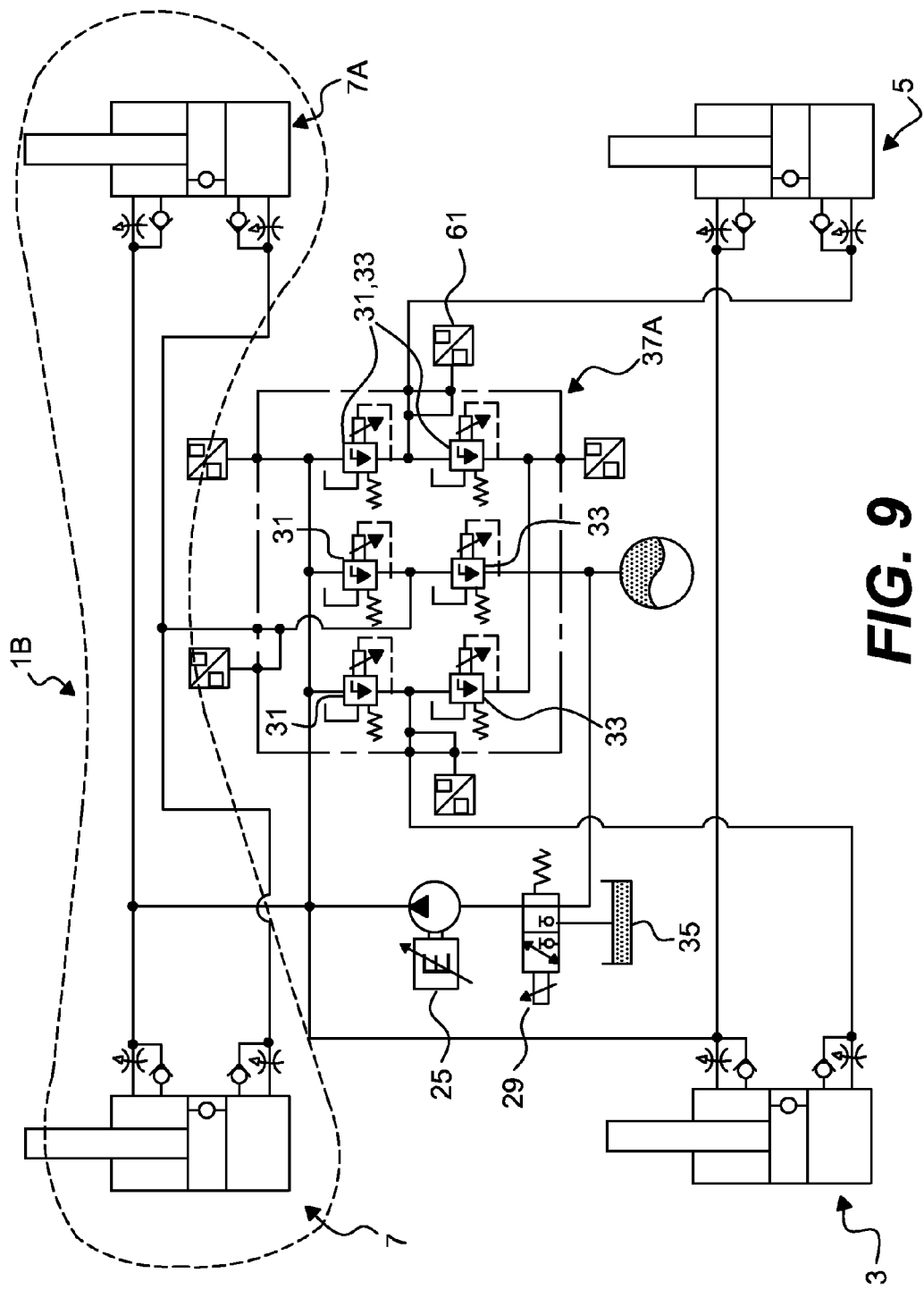
FIG. 9 is a schematic representation of an alternative embodiment of a four-point actuator arrangement using a three-point hydraulic system.

Alternatively, as illustrated in FIG. 9, it is also possible to operate a four-point hydraulic suspension system 1B from a three-point circuit layout. The actuators on a front end, or as the case may be a rear end of the suspended structure, as determined by the direction of movement, can use a common pair of first and second pressure control valves 31, 33. While four actuators may reduce the overall system pressure to some extend, three individual actuators, with the associated minimum of first and second control valves 31, 33, are all that is required to reduce the movements of roll, pitch and heave. If warp control is additionally required it may be economically justified to use the four-actuator alternative 1B of FIG. 9, or even the more sophisticated four-actuator variant 1A shown in FIGS. 2 and 4. In particular the variation of FIG. 9 has its pressure control valves 31, 33 for the left and right rear actuators 3, 5 and pressure control valves commonly used for the left and right front actuators concentrated within a central unit 37A. The circuit of the central pressure control unit 37A can be connected to one or more position sensors 61.

In addition to passive damping, during straight-on driving, it is also possible to achieve further comfort improvements by using a so-called "Skyhook" damper control. Control methods which emulate the so-called "Skyhook" damper are described in Karnopp, D.C. et al.: "Vibration Control Using Semi-active Force Generators," ASME Paper No. 73-DET-122 (June 1974). Semi-active dampers and various control methods for them are disclosed in the following patent documents: Karnopp: U.S. Pat. No. 3,807,678; Miller et al.: U.S. Pat. No. 4,821,849, U.S. Pat. No. 4,838,392 and 4898264; Boone, U.S. Pat. No. 4,936,425; Ivers, U.S. Pat. No. 4,887,699; and U.S. Pat. No. 6,311,110.

While in general the invention has been described in reference to a multi-point hydraulic suspension system (1) for a land vehicle that has three individual hydraulic actuators (3, 5, 7), it should be clear that in fact two or more actuators (3, 5, 7) can each be operatively arranged between a suspended structure and a wheeled base of a land vehicle. In the case of a two-wheeled vehicle, such as a motor cycle it is only required to provide two individual hydraulic actuators. Conceivably however also a vehicle having four wheels can have two of its actuators assigned to a first pump and its two remaining actuators to a second pump. This arrangement may be useful when the vehicle is so heavy that one pump unit is not enough to meet the required specifications. In that case two pumps may be needed and by way of example each single pump per two actuators, may take care of either the front or the rear wheels of the car respectively. Thus basically at least two actuators are the practical minimum to form a multi-point hydraulic system.

Accordingly the invention thus provides for a multi-point hydraulic suspension system (1) for a land vehicle that has two or more individual hydraulic actuators (3, 5, 7). These two or more actuators (3, 5, 7) are each operatively arranged between a suspended structure and a wheeled base of the land vehicle for relative positioning one another. A common supply of pressurized fluid has a given pressure and a selectively operable pump (21) with an inlet and an outlet, for increasing the given pressure of the common supply of pressurized fluid. A fluid reservoir (35) is in selective fluid communication with the inlet of the pump. Controllable valve means (31, 33) are interposed between each of the two or more actuators and the common supply of pressurized fluid for selectively bringing each of the two or more actuators into fluid communication with the common supply of pressurized fluid in response to a control unit (41) for controlling the valve means (31, 33) and the pump (21). It is thus believed that the operation and construction of the present invention will be apparent from the subject description and drawings. The invention is not limited to any embodiment herein described and, within the purview of the skilled person; modifications are possible which should be considered within the scope of the appended claims. Equally all kinematic inversions are considered inherently disclosed and to be within the scope of the present invention. The term comprising when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Indications of position and direction, as used in the subject description and including expression like "upper" and "lower" or "upward" and "downward", are merely used to be commensurate with the positions and directions shown in the drawing figures, but do not limit the invention to such positions or directions. Features which are not specifically or explicitly described or claimed may be additionally included in the structure according to the present invention without deviating from its scope.

The invention claimed is:

1. A multi-point hydraulic suspension system for a land vehicle having a suspended structure and a wheeled base, the hydraulic suspension system including:
   two or more individual hydraulic actuators, operatively arranged between the suspended structure and the wheeled base for relative positioning of the suspended structure in relation to the wheeled base;
   a common supply of pressurized fluid, having a given pressure;
   a selectively operable pump having an inlet and an outlet, for increasing the given pressure, the outlet being in fluid connection with the common supply of pressurized fluid;
   a fluid reservoir in selective fluid communication with the inlet of the pump;
   controllable valve means, interposed between each of the at least two actuators and the common supply of pressurized fluid for selectively bringing each of the at least two actuators into fluid communication with the common supply of pressurized fluid, wherein the controllable valve means include a first pressure control valve and a second pressure control valve associated with each of the at least two actuators; and
   a control unit for controlling the valve means and the pump, wherein the control unit is arranged, in use, to
   passively damp movements of major vehicle masses during driving in straight-on conditions, including selective interruption of pump operation;
   control ride level height only once upon preparing the vehicle for driving; and to
   reserve dynamic suspension and movement control substantially for driving conditions relating to cornering, accelerating, decelerating and braking.

2. The multi-point hydraulic suspension system according to claim 1, wherein each of the at least two individual hydraulic actuators has at least one shock absorber valve interposed between the actuator and the controllable valve means.

3. The multi-point hydraulic suspension system according to claim 1, further including a third and a fourth individual and independent hydraulic actuator.

4. The multi-point hydraulic suspension system according to claim 1, wherein the common supply of pressurized fluid is a hydraulic circuit.

5. The multi-point hydraulic suspension system according to claim 1, wherein the selectively operable pump is an electro-hydraulic power module.

6. The multi-point hydraulic suspension system according to claim 5, wherein the pump, with the exclusion of other pumps, is the sole pump of the system.

7. The multi-point hydraulic suspension system according to claim 5, wherein the selectively operable pump is an electro-hydraulic power pack.

8. The multi-point hydraulic suspension system according to claim 1, wherein the system further includes an accumulator.

9. The multi-point hydraulic suspension system according to claim 1, wherein the actuator includes a movable element capable of volumetric displacement and first and second actuator volumes separated by the movable element.

10. The multi-point hydraulic suspension system according to claim 9, wherein the controllable valve means include a first pressure control valve and a second pressure control valve associated with each of the at least two actuators each for selectively connecting a respective one of the first and second actuator volumes to the supply of pressurized fluid.

11. The multi-point hydraulic suspension system according to claim 9, wherein at least one of the at least two actuators is a linear actuator.

12. The multi-point hydraulic suspension system according to claim 11, wherein the linear actuator is a telescopic piston and cylinder assembly.

13. The multi-point hydraulic suspension system according to claim 12, wherein the telescopic piston and cylinder assembly is a modified commercially available hydraulic shock absorber.

14. The multi-point hydraulic suspension system according to claim 1, wherein the suspended structure is a vehicle body.

15. The multi-point hydraulic suspension system according to claim 1, wherein the suspended structure is a cabin.

16. The multi-point hydraulic suspension system according to claim 1, wherein the suspended structure is a chassis.

17. The multi-point hydraulic suspension system according to claim 1, wherein the wheeled base is a single wheel assembly.

18. The multi-point hydraulic suspension system according to claim 1, wherein the wheeled base includes at least two independent wheel assemblies.

19. The multi-point hydraulic suspension system according to claim 1, wherein the land vehicle is associated with a prime mover.

20. The multi-point hydraulic suspension system according to claim 1, wherein an additional passive load supporting element is associated with at least one of the at least two actuators.

21. The multi-point hydraulic suspension system according claim 20, wherein the passive load supporting element is a suspension spring provided in parallel to at least one of the at least two actuators for bearing a substantial portion of mass.

22. The multi-point hydraulic suspension system according to claim 1, wherein the control unit for controlling the valve means and the pump is adapted to receive sensor information relating to parameters derived from vehicular components selected from a group consisting of steering, brakes, wheels, body structure, throttle, and gearbox.

23. The multi-point hydraulic suspension system according to claim 22, wherein the parameters, include steering angle, brake pressure, throttle movement and body structure movement.

24. The multi-point hydraulic suspension system according to claim 1, wherein the control unit includes a condition estimator.

25. The multi-point hydraulic suspension system according to claim 1, wherein the control unit includes a condition control device.

26. The multi-point hydraulic suspension system according to claim 1, wherein the control unit includes a local actuator control.

27. The multi-point hydraulic suspension system according to claim 1, wherein the control unit includes a pump control.

28. The multi-point hydraulic suspension system according to claim 1, wherein the control unit includes a human interface.

29. The multi-point hydraulic suspension system according to claim 1, wherein the control unit includes a sensor input.

30. The multi-point hydraulic suspension system according to claim 29, wherein the sensor input is connected to a position sensor.

31. The multi-point hydraulic suspension system according to claim 1, including means for determining static loads.

32. The multi-point hydraulic suspension system according to claim 31, wherein the means for determining static loads include a load cell.

33. The multi-point hydraulic suspension system according to claim 1, including means for determining dynamic loads.

34. The multi-point hydraulic suspension system according to claim 33, wherein the means for determining dynamic loads include an acceleration sensor.

35. A method of operating a hydraulic suspension system for a land vehicle according to claim 1, the method including:
passively damping movements of major vehicle masses during driving in straight-on conditions;
controlling ride level height only once upon preparing the vehicle for driving; and
reserving dynamic suspension and movement control substantially for driving conditions relating to cornering, accelerating, decelerating and braking.

* * * * *

UNITED STATES PATENT AND TRADEMARK OFFICE
CERTIFICATE OF CORRECTION

PATENT NO. : 8,672,337 B2 Page 1 of 1
APPLICATION NO. : 13/058636
DATED : March 18, 2014
INVENTOR(S) : Albertus Clemens Maria van der Knaap and Arjan Pieter Teerhuis It is certified that error appears in the above-identified patent and that said Letters Patent is hereby corrected as shown below:

In the Claim:

Column 11

Lines 30-31, delete "according claim" and insert -- according to claim --

Signed and Sealed this
Tenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,672,337 B2  
APPLICATION NO. : 13/058636  
DATED : March 18, 2014  
INVENTOR(S) : van der Knaap et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 237 days.

Signed and Sealed this

Twenty-ninth Day of September, 2015

Michelle K. Lee
*Director of the United States Patent and Trademark Office*